United States Patent
Wallrafen (12) 
(10) Patent No.: US 6,417,662 B1
(45) Date of Patent: Jul. 9, 2002

(54) TACHOGENERATOR FOR DETECTING THE ROTATIONAL SPEED OF A ROTATING MACHINE PART

(75) Inventor: Werner Wallrafen, Hofheim (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/499,718

(22) Filed: Feb. 8, 2000

(30) Foreign Application Priority Data

Feb. 19, 1999 (DE) .......................................... 199 06 937

(51) Int. Cl.$^7$ ................................................ G01P 3/44
(52) U.S. Cl. .................................. 324/174; 324/207.25
(58) Field of Search ........................ 324/207.2, 207.21, 324/207.25, 207.26, 252, 166, 173, 174; 338/32 R, 32 H; 341/15; 310/156.01, 68 R, 268

(56) References Cited

U.S. PATENT DOCUMENTS

| 4,370,614 A | 1/1983 | Kawada et al. ............. 324/173 |
| 5,089,817 A | 2/1992 | Santos et al. ................. 341/15 |
| 5,241,267 A | 8/1993 | Gleixner et al. ......... 324/207.2 |
| 5,680,042 A | 10/1997 | Griffin et al. .......... 324/207.21 |

FOREIGN PATENT DOCUMENTS

| DE | 2643286 | 3/1978 |
| EP | 0062698 | 10/1981 |
| EP | 0464404 A1 | 1/1992 |
| EP | 0806673 A2 | 11/1997 |
| EP | 0806673 A3 | 7/1998 |
| JP | 61130872 | 6/1986 |

*Primary Examiner*—Jay Patidar
(74) *Attorney, Agent, or Firm*—Mayer, Brown, Rowe & Maw (57) ABSTRACT

In a tachogenerator for detecting the rotation speed of a rotating machine part, in particular that of a vehicle wheel, having a predetermined measurement resolution, having at least one magnetically acting encoder which can rotate with the machine part, has magnetically acting areas which are subdivided in a predetermined sequence into angle parts, in particular teeth composed of ferromagnetic material or a magnetic pole ring, and which, during rotation, produces a measurement signal in at least one magnet sensor which is arranged to be stationary relative to the encoder and is separated from said encoder by an air gap, which measurement signal corresponds to the angular pitch of the encoder and whose frequency corresponds to the rotation frequency of the machine part, in order to produce measurement signals which can be evaluated with an air gap which is not constant, the angular pitch of the encoder is coarser than the predetermined measurement resolution requires, and at least two magnet sensors are provided, which are arranged fixed one behind the other in the rotation direction, relative to the encoder, in order to produce at least two mutually phase-shifted measurement signals which correspond to the angular pitch of the encoder, and means are provided for linking the measurement signals emitted by the sensors to form an output signal, with the output signal being at a frequency which is greater than the measurement signals of the magnet sensors, in order to achieve the predetermined measurement resolution.

36 Claims, 5 Drawing Sheets

PRIOR ART

PRIOR ART

PRIOR ART

TACHOGENERATOR FOR DETECTING THE ROTATIONAL SPEED OF A ROTATING MACHINE PART

FIELD OF THE INVENTION

The invention relates to a tachogenerator for detecting the rotational speed of a rotating machine part, in particular that of a vehicle wheel. The tachogenerator has a predetermined measurement resolution and at least one magnetically acting encoder which can rotate with the machine part. It also has magnetically acting areas which are subdivided in a predetermined sequence into angle parts, in particular teeth composed of ferromagnetic material or a magnetic pole ring, and which, during rotation, produces a measurement signal in at least one magnet sensor which is arranged to be stationary relative to the encoder and is separated from said encoder by an air gap. The measurement signal corresponds to the angular pitch of the encoder whose frequency corresponds to the rotational frequency of the machine part.

Present-day tachogenerators, which are used for measuring the wheel rotation speed of motor vehicles, must have a resolution of at least about 40 to 60 pulses per wheel revolution, in particular for use in conjunction with ABS systems, starting aids, and vehicle dynamics and anti-skid control systems. Conventional tachogenerators use an encoder which is attached to the rotating components and is subdivided into a number of hard-magnetic pole pairs corresponding to the resolution of the tachogenerator, or comprises a toothed wheel, which is manufactured from ferromagnetic material and has a corresponding number of teeth. In the latter case, the magnetically sensitive sensor, for example a Hall sensor or a magnetoresistive sensor, is magnetically preloaded by a permanent magnet. The encoder is magnetically coupled to a magnet sensor via an air gap. The continuously changing magnetic field during rotation of the encoder produces a measurement signal, whose frequency corresponds to the rotation frequency of the encoder.

Conventional magnet sensors allow a maximum air gap width of only about 2 mm, since, otherwise, the measurement signal is too weak. This results in considerable manufacturing complexity.

DESCRIPTION OF RELATED ART

EP 0 806 673 proposes a tachogenerator which uses a GMR sensor (giant magnetoresistive effect). Owing to the increased sensitivity of such a sensor, the tachogenerator operates even with large air gap widths of about 4 mm. The measurement signal emitted by the GMR sensor is twice the frequency of that emitted by a conventional sensor, since the characteristic of the GMR sensor has mirror-image symmetry. Furthermore, smaller air gaps result in the measurement signal having a poor duty ratio. The duty ratio can be stabilized by using a frequency divider to halve the frequency of the measurement signal. The duty ratio of the measurement signal from such GMR sensors is highly dependent on the air gap width, so that, although the tachogenerator operates with large air gap widths, its response varies severely, however, if the air gap does not remain constant. For example, the air gap varies with the load state of the rotating machine part or as its bearing wears.

When such a tachogenerator is fitted to the wheels of a motor vehicle, a large air gap has considerable advantages, since large dynamic forces occur at this point and the structure is correspondingly severely elastically deformed. This results in the geometry and therefore also the air gap of the tachogenerator varying continuously and considerably. The solutions to this problem which have been found so far can be implemented only subject to major costs.

OBJECTS OF THE INVENTION

The object of the present invention is to specify a tachogenerator which still operates reliably, even with a comparatively large air gap which is not constant, but which can nevertheless be produced easily and at low cost, and which operates with the necessary resolution.

The object is achieved in that, in order to produce measurement signals which can be evaluated with an air gap which is not constant, the angular pitch of the encoder is coarser than the predetermined measurement resolution requires, and at least two magnet sensors are provided, which are arranged fixed one behind the other in the rotation direction, relative to the encoder, in order to produce at least two mutually phase-shifted measurement signals which correspond to the angular pitch of the encoder, and means are provided for linking the measurement signals emitted by the sensors to form an output signal, with the output signal being at a frequency which is greater than the measurement signals of the magnet sensors, in order to achieve the predetermined measurement resolution.

To this end, a first refinement of the invention provides for the magnet sensors to have Hall elements.

A further refinement of the invention provides for the magnet sensors to have magnetoresistive sensor elements.

BRIEF SUMMARY OF THE INVENTION

By using a plurality of sensors, the required measurement resolution can be achieved even if the angular pitch of the encoder is much smaller than the required resolution of the measurement signal.

When the pitch of the encoder is reduced, this results in a greater magnetic flux density, since the distances between the magnetically acting elements of the encoder are increased. For example, the number of teeth or the number of poles of an encoder toothed wheel composed of ferromagnetic or hard-magnetic material is halved in comparison with the desired resolution. In consequence, the tooth gaps or the poles of the encoder are enlarged, and the amplitude of the measurement signal is in consequence also increased. The individual measurement signals are then linked to one another in such a manner that the angular pitch of the encoder is half the magnitude of the resolution of the tachogenerator, and in such a manner that the frequency of the output signal is twice the frequency of the measurement signals. This can be achieved by simple links which are carried out in a circuit connected to the sensors or in an integrated circuit, or in a microprocessor.

Such a sensor operates reliably with air gap widths of more than 2 mm.

As an alternative solution to the object on which the invention is based, it is proposed that at least two such magnet sensors be provided which are arranged fixed one behind the other in the rotation direction, relative to the encoder, in order to produce at least two mutually phase-shifted measurement signals, which correspond to the angular pitch of the encoder, in the case of which magnet sensors the mathematical sign of their characteristic behaves at least approximately with mirror-image symmetry with respect to the magnetic field strength, that, in order to produce measurement signals which can be evaluated with an air gap which is not constant, the angular pitch of the encoder be coarser than the predetermined measurement resolution requires, and means be provided for linking the measurement signals emitted by the magnet sensors to form an output signal, with the output signal being at a lower frequency than the original measurement signals, in order to achieve a good duty ratio.

Such a characteristic is found, for example, in so-called GMR sensors. As a rule, GMR sensors comprise two or four magnetoresistive sensor elements which are connected on a small chip to form a Wheatstone bridge. The measurement signal from such a sensor is derived from the change in the diagonal resistance of the bridge circuit.

GMR sensors have a mirror-image symmetrical characteristic in comparison with conventional magnetoresistive sensors, so that they emit a measurement signal at twice the frequency of the measurement signal of conventional sensors. However, particularly at high magnetic field strengths, this measurement signal has a poor duty ratio. According to the invention, a stable output signal duty ratio which is independent of the field strength, and thus of the air gap width, is achieved by linking the measurement signals while reducing, for example halving, the frequency of the measurement signals.

The linking of the individual measurement signals according to the invention can be carried out, for example, by means for binary exclusive-OR linking to form the output signal, by means for multiplication to form the output signal, or by means for forming the magnitude of the difference in order to produce the output signal.

One refinement of the invention provides for the measurement signals to be phase-shifted through about 90°. The signals can thus be easily linked to form an output signal which is at twice the frequency of the measurement signals.

The measurement signals can be linked by the magnet sensors being connected to an exclusive-OR circuit via threshold-value switches, in order to produce the output signal. This arrangement may be used both in conjunction with Hall sensors or magnetoresistive sensors, and with GMR sensors.

In a next refinement of the invention, the measurement signals are linked by the sensors being connected to a multiplication circuit, in order to produce the output signal.

A further refinement of the invention using GMR sensors provides for the sensors to be connected via threshold-value switches to flipflop circuits whose outputs are linked to an exclusive-OR circuit in order to produce the output signal.

Where mirror-image symmetrical GMR signals are used at twice the frequency, the signal frequency is first of all halved via flipflops before the two channels are linked by the exclusive-OR circuit. This frequency halving is intended to stabilize the duty ratio at exactly 50%.

In order to determine the rotation direction, a development of the invention provides for means to be provided for producing a rotation-direction signal from the measurement signals. The rotation direction can be determined in a manner known per se, for example by linking the measurement signals by means of an edge-controlled flipflop. The rotation-direction signal can be modulated in a manner known per se onto the rotation-frequency signal, for transmission via a two-wire interface. Details relating to this are specified, for example, in Patent Application 198 19 783.7

The two sensor signals required to increase the frequency allow rotation-direction identification, which can be achieved easily, for additional purposes without any major additional complexity.

Further advantageous improvements of the invention are achieved by the measures outlined in the other dependent claims.

Exemplary embodiments of the invention are explained in more detail in the following description and are illustrated in a number of figures in the drawing, in which:

DESCRIPTION OF THE DRAWINGS

Identical parts are provided with the same reference symbols in the figures.

Figure 1:
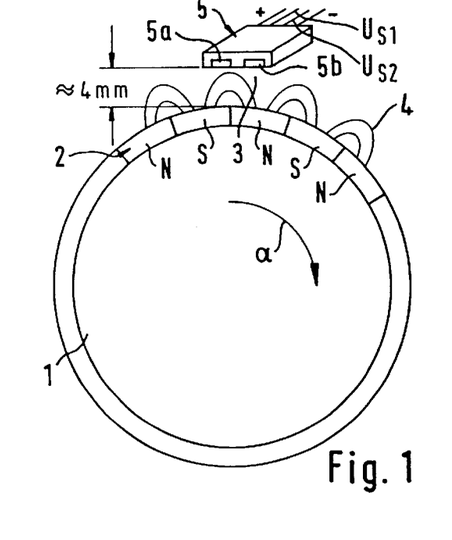
FIG. 1 shows a schematic illustration of a tachogenerator according to the invention, having half the number of poles and two magnetic sensors.

FIG. 1 shows a schematic illustration of a tachogenerator according to the invention, comprising an encoder wheel 1 which is mounted on a shaft (which is not illustrated). On its circumference, the encoder wheel 1 has magnetic-pole pairs N, S which produce magnetic fields 4 that extend outward beyond an air gap 3. During rotation of the encoder wheel 1, the magnetic fields 4 produce measurement signals $U_{S1}$, $U_{S2}$ in sensors fitted in a sensor housing 5. The coarse angular pitch of the pole pairs N, S result in the magnetic fields 4 having relatively large field strengths. The air gap 3 may thus be chosen to be relatively large (about 4 mm). The number of pole pairs 2 of the encoder wheel 1 is in this example about half the magnitude of the measurement resolution of the tachogenerator. Hall sensors, anisotropic magnetoresistive sensors or else GMR sensors may be used as the sensors 5a, 5b. The distance between the two sensors 5a, 5b corresponds to half the distance between the pole pairs.

Figure 2:
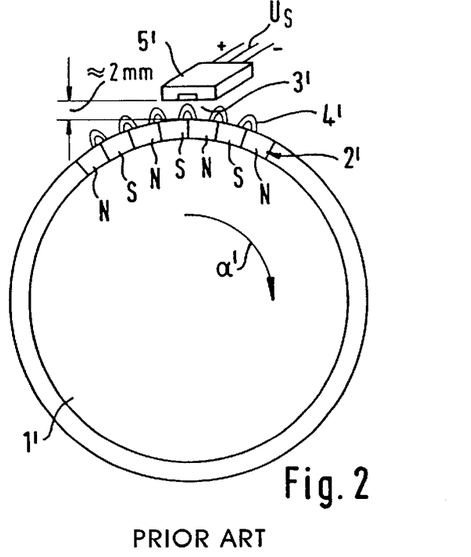
FIG. 2 shows a schematic illustration of a tachogenerator according to the prior art, where the number of poles has not been halved.

FIG. 2 shows a tachogenerator according to the prior art, schematically. The number of magnetic poles 2' of the encoder wheel 1' corresponds to the required measurement resolution. The magnets 2' produce only weak fields 4', since their size is limited. This necessitates a fairly small air gap 3' (about 2 mm) between the encoder wheel 1' and the sensor 5'.

In the following text, analog measurement signals are denoted by U with indices. Quantized measurement signals are assigned the letter D with indices. The output signals of the various circuits are denoted by A. B is the magnetic flux density acting on the sensors. The signal diagrams are in each case illustrated with respect to the rotation angle (of the encoder wheel 1 of the tachogenerator according to the invention and of the known tachogenerator. Those areas of the diagrams in which the north pole N of a pole pair N, S of the encoder wheel is located on the axis of symmetry of the sensor pair 5 have N written over them. A corresponding situation applies to the south pole S.

Figure 3:
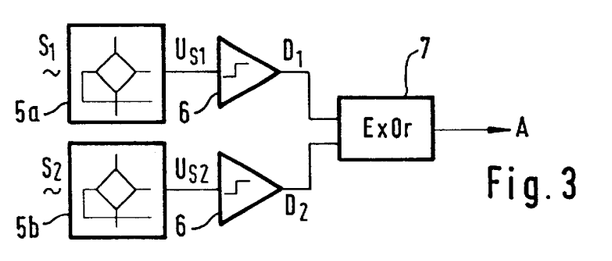
FIG. 3 shows a block diagram of a tachogenerator according to the invention having two magnetic sensors, threshold-value switches and exclusive-OR linking for the measurement signals.

In order to double the frequency of the measurement signals $U_{S1}$, $U_{S2}$ shown in FIG. 1, they are first of all passed, as is shown in FIG. 3, via threshold-value switches 6 for quantization, and are then exclusive-OR linked at 7. The output signal A is at twice the frequency of the measurement signals $U_{S1}$, $U_{S2}$. Although the pitch of the encoder 1 in FIG. 1 is smaller, the desired measurement resolution is achieved.

Figure 4:
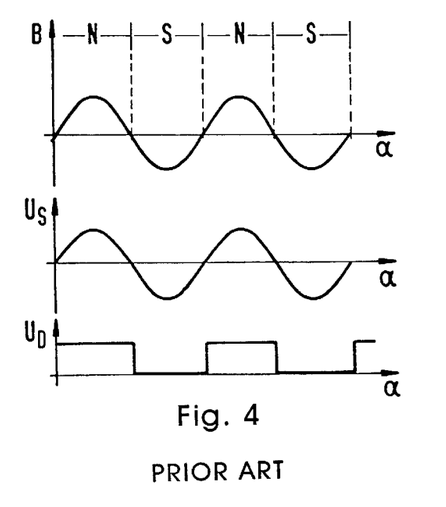
FIG. 4 shows signal diagrams for the known tachogenerator as shown in FIG. 2, with a threshold-value circuit for the measurement signal using two magnetic sensors.

FIG. 4 shows the diagrams of the magnetic field strength B, of the measurement voltage $U_S$ of a Hall or magnetoresistive sensor 5' (FIG. 2) as well as the measurement voltage $U_D$ (quantized by a threshold-value switch that is not shown) of the tachogenerator shown in FIG. 2.

Figure 5:
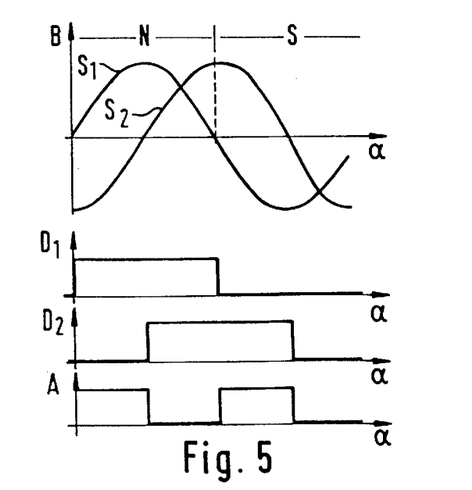
FIG. 5 shows signal diagrams of the tachogenerator as shown in FIG. 1, when two magnetic sensors are used.

FIG. 5 shows signal diagrams of a tachogenerator according to the invention and as shown in FIGS. 1 and 3 when using magnetoresistive sensors or Hall sensors 5a, 5b. A first 5a of the sensors 5a, 5b has the field-strength profile S1 applied to it, and the second 5b has the field-strength profile S2 applied to it. The discrete measurement signals D1 and D2 which result from this and are present at the outputs of the threshold-value switches 6 are phase-shifted through about 90° with respect to one another, corresponding to the distance between the sensors 5a, 5b. The output signal A is obtained from them by exclusive-OR linking 7.

GMR sensors 5a, 5b with measurement signals $U_{S1}$ and $U_{S2}$ are used in the exemplary embodiments, which will be explained with reference to the following figures.

Figure 6:
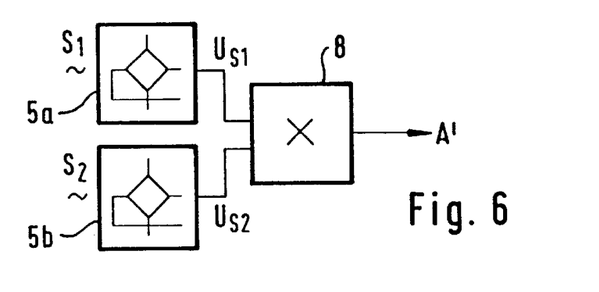
FIG. 6 shows a block diagram of a tachogenerator according to the invention, with the measurement signals being multiplied.

FIG. 6 shows a block diagram of a tachogenerator according to the invention with a multiplication function 8 for linking the measurement signals $U_{S1}$, $U_{S2}$ to form an output signal A', which is at twice the frequency of the measurement signals $U_{S1}$, $U_{S2}$.

Figure 7:
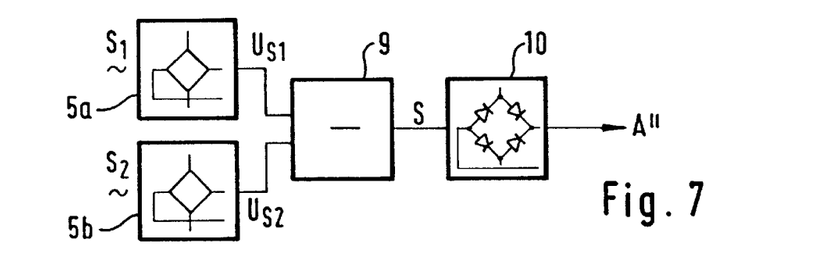
FIG. 7 shows a block diagram of a tachogenerator according to the invention, with the measurement signals being subtracted and their magnitudes then being formed.

FIG. 7 shows a block diagram of a tachogenerator according to the invention with a subtraction function 9 and subsequent magnitude-formation 10, from which an output signal A" is likewise produced, at twice the frequency of that of the measurement signals $U_{S1}$, $U_{S2}$.

Figure 8:
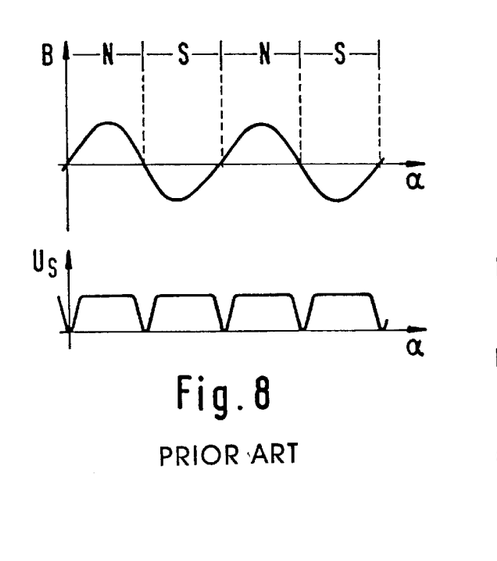
FIG. 8 shows signal diagrams of the known tachogenerator as shown in FIG. 2, using GMR sensors with a mirror-image symmetrical characteristic and a small air gap.

When a GMR sensor is used, the measurement voltage Us is at twice the frequency of the input variable B, from the start, as can also be seen from FIG. 8. The figure shows the signal diagrams for a known tachogenerator as shown in FIG. 2, using a GMR sensor 5' with a small air gap size.

Figure 9:
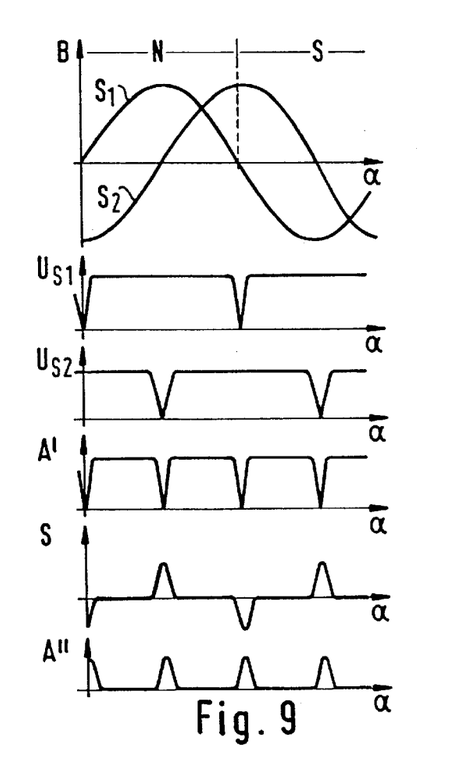
FIG. 9 shows signal diagrams of the tachogenerators as shown in the block diagrams in FIGS. 6 and 7, using two GMR sensors with a phase shift of about 90°.

FIG. 9 shows the signal diagrams of the tachogenerators according to the invention as shown in the block diagrams in FIGS. 6 and 7, using GMR sensors 5a, 5b. In this case, the illustrations of $S_1$, $S_2$, $U_{S1}$ and $U_{S2}$ apply to both tachogenerators, while A' occurs with the tachogenerator shown in FIG. 6, and S and A" occur with the tachogenerator shown in FIG. 7.

Figure 10:
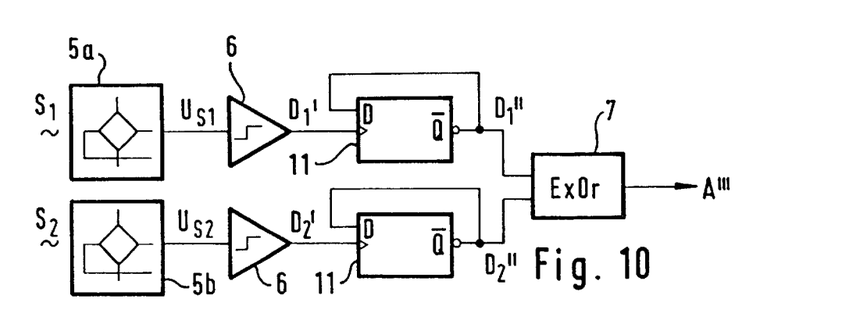
FIG. 10 shows a block diagram of a tachogenerator according to the invention with a threshold-value circuit, flipflop circuit and exclusive-OR linking of the signals, in particular for GMR sensors.

FIG. 10 shows a block diagram of a tachogenerator according to the invention, with threshold-value switches 6 which are provided for quantization of the measurement signals $U_{S1}$, $U_{S2}$, in each case one downstream flipflop circuit 11 for halving the frequency of the GMR sensor signal, and final exclusive-OR linking of the measurement signals $D_1"$, $D_2"$ in order to double the frequency.

Figure 11:
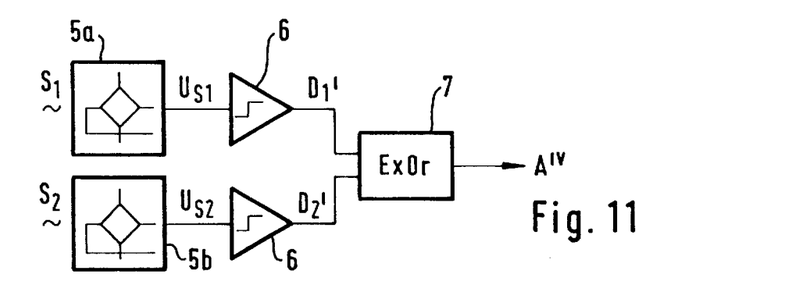
FIG. 11 shows a block diagram of a tachogenerator according to the invention, with exclusive-OR linking of the measurement signals, without a flipflop circuit for frequency halving.

FIG. 11 shows a block diagram of a tachogenerator according to the invention, in which, after quantization at 7, the measurement signals $U_{S1}$, $U_{S2}$ are exclusive-OR linked without frequency division. This tachogenerator differs from that illustrated in FIG. 10 by the duty ratio ($A^{IV}$) not being stabilized.

Figure 12:
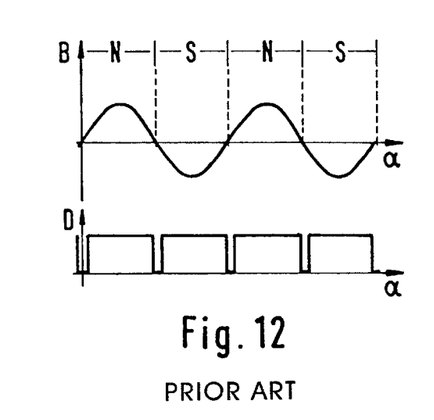
FIG. 12 shows signal diagrams of the known tachogenerator as shown in FIG. 2, using GMR sensors, a threshold-value circuit and with the magnitude of the measurement signal being formed.
Figure 13:
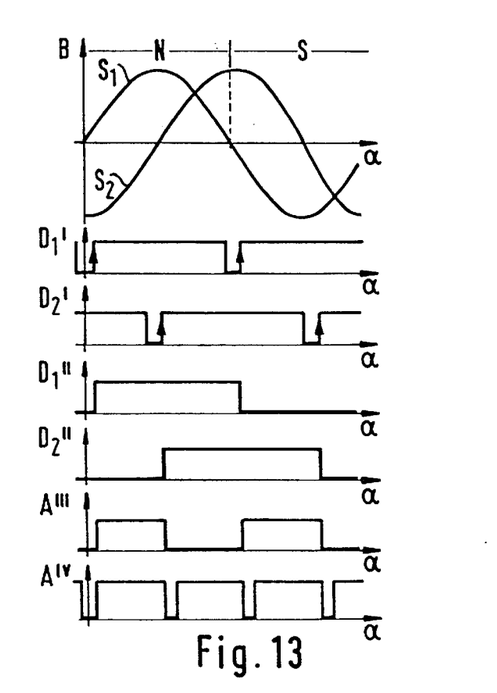
FIG. 13 shows signal diagrams of the tachogenerators as shown in the block diagrams in FIGS. 10 and 11, using GMR sensors.

The signal diagrams for the tachogenerator shown in FIGS. 12 and 13 have pure binary signal processing, with quantization by the threshold-value switches, before the exclusive-OR linking shown in FIGS. 10 and 11.

Figure 14:
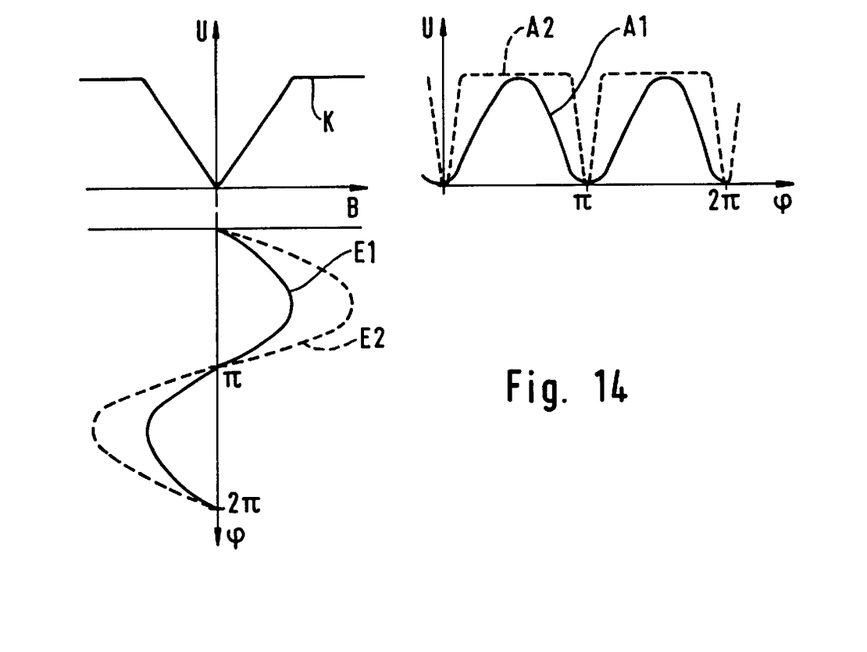
FIG. 14 shows diagrams of the characteristic of a GMR sensor, of two magnetic input variables of different intensity, and of the measurement signals resulting from them.

The GMR sensors 5a, 5b used according to the invention have a characteristic K which, as can be seen from FIG. 14, is mirror-image symmetrical to the input variable B, in terms of its mathematical sign. This behavior results in a measurement signal A1, A2 at twice the frequency being produced from an input variable E1, E2. The dashed line shows the behavior at high magnetic flux densities, which occur with small air gap sizes.

Figure 15:
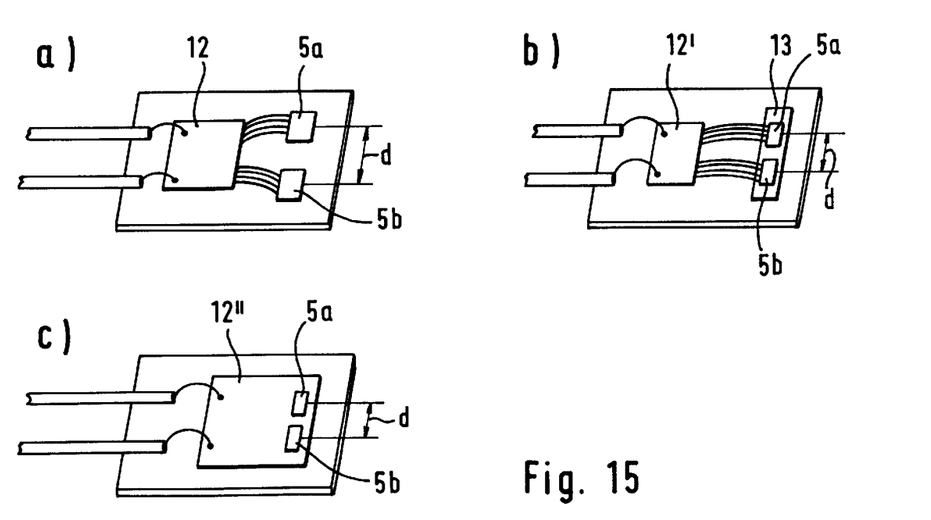
FIG. 15a shows a schematic illustration of a circuit arrangement according to an embodiment of the invention.
FIG. 15b shows a schematic illustration of a circuit arrangement according to another embodiment of the invention.
FIG. 15c shows a schematic illustration of a circuit arrangement according to another embodiment of the invention; the claims as follows.

FIG. 15 shows schematically how the sensors 5a and 5b can each be connected to and integrated with an evaluation circuit 12. In Figure a), the sensors 5a, 5b are connected individually to the circuit 12, at a distance d. Figure b) shows that the sensors 5a, 5b can be arranged on a common substrate 13, which has the advantage that the distance d can be maintained very accurately during manufacture of the sensor arrangement 5. For the same reason, the sensors 5a, 5b in Figure c) are arranged on the circuit 12" itself.

Figure 16:
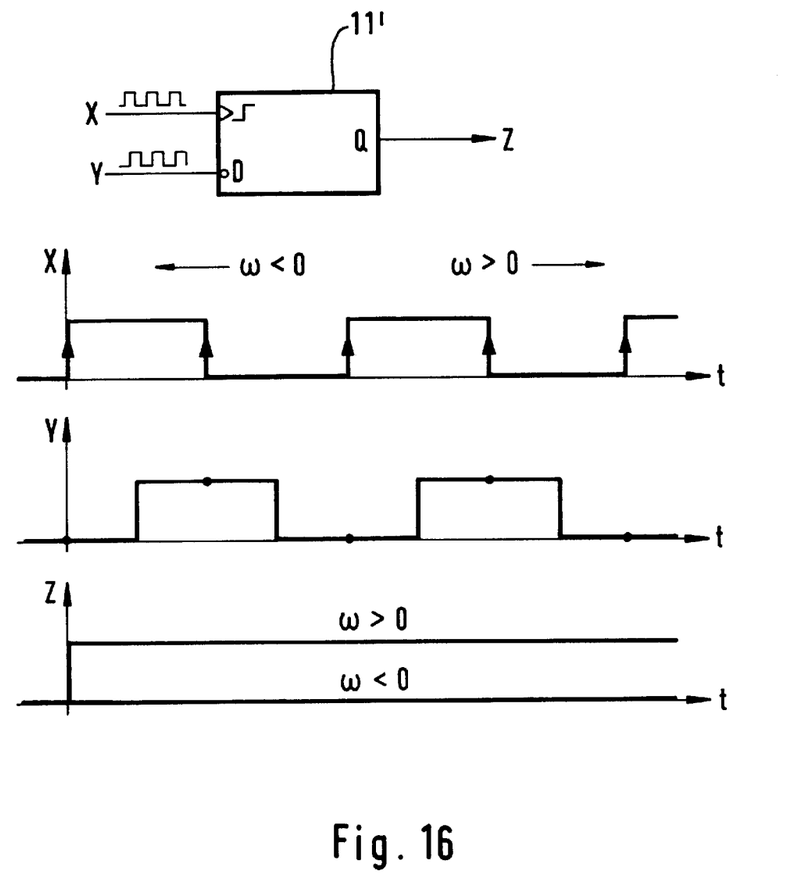
FIG. 16 shows a circuit layout and signal diagrams relating to output signals of the sensors used, and using a flipflop circuit for rotation-direction identification.

FIG. 16 shows that an output signal Z which indicates the rotation direction of the encoder wheel, that is to say whether the angular speed has a positive or negative omega, can be produced from the output signals X and Y using a flipflop circuit 11'.

What I claim is:
1. A tachogenerator for detecting the rotation speed of a rotating machine part comprising:
   at least one magnetically acting encoder which can rotate with the machine part, said encoder comprising magnetically acting areas subdivided into angle parts spaced a distance apart from each other, said distance between said angle parts defining an angular pitch; wherein the magnetically acting areas are composed of ferromagnetic material or a magnetic pole ring; and wherein during rotation said encoder produces a measurement signal;

a sensor for receiving the measurement signal, said sensor having a predetermined measurement resolution corresponding to a required signal frequency, and arranged to be stationary relative to the encoder and separated from said encoder by an air gap which may not remain constant relative to the encoder and magnet sensor;

wherein said measurement signal corresponds to the angular pitch of the encoder and wherein the frequency of the measurement signal corresponds to the rotation frequency of the machine part; and wherein the angular pitch of the encoder is larger than the predetermined measurement resolution requires;

wherein said sensor comprises at least two magnet sensors (5a, 5b) arranged fixed one behind the other in the rotation direction, relative to the encoder (1), in order to produce at least two mutually phase-shifted measurement signals ($U_{S1}$, $U_{S2}$) which correspond to the angular pitch of the encoder; and means for linking the measurement signals ($U_{S1}$, $U_{S2}$) emitted by the sensors (5a, 5b) to form an output signal (A), said output signal (A) being at a frequency which is greater than the measurement signals ($U_{S1}$, $U_{S2}$) of the magnet sensors, in order to achieve the predetermined measurement resolution.

2. The tachogenerator as defined in claim 1, wherein the magnet sensors are Hall elements.

3. The tachogenerator as defined in claim 1, wherein the magnet sensors (5a, 5b) are magnetoresistive sensor elements.

4. The tachogenerator as defined in claim 1, wherein the angular pitch of the encoder (1) is half the magnitude of the measurement resolution, and wherein the frequency of the output signal (A) is twice the frequency of the measurement signals ($U_{S1}$, $U_{S2}$).

5. The tachogenerator as defined claim 1, wherein the magnet sensors (5a, 5b) are arranged in a common housing (5).

6. The tachogenerator as defined in claim 1, wherein the magnet sensors (5a, 5b) are arranged on a common substrate.

7. The tachogenerator as defined claim 1, further comprising a means for modulation of a rotation-speed signal with a rotation-direction signal, for transmission via a two-wire interface.

8. The tachogenerator as defined in claim 1, wherein the encoder (1) has about 20 to 30 hard-magnetic pole pairs (N, S).

9. The tachogenerator as defined in claim 1, wherein the encoder is composed of plastic with bonded hard-magnetic particles.

10. The tachogenerator as defined in claim 1, wherein the encoder is composed of an elastomer with bonded hard-magnetic particles.

11. The tachogenerator as defined in claim 10, wherein the encoder is the rotating seal of a wheel bearing.

12. A tachogenerator for detecting the rotation speed of a rotating machine part comprising:

at least one magnetically acting encoder which can rotate with the machine part that has magnetically acting areas which are subdivided in a uniform sequence into angle parts spaced a distance apart from each other, said distance between said angle parts defining an angular pitch; wherein the magnetically acting areas are composed of ferromagnetic material or magnetic poles, and which, during rotation, produces a measurement signal;

a sensor for receiving said measurement signal, said sensor having a predetermined measurement resolution corresponding to a required signal frequency, and arranged to be stationary relative to the encoder and separated from said encoder by an air gap which may not remain constant relative to the encoder and magnet sensor;

wherein said measurement signal corresponds to the angular pitch of the encoder and wherein the frequency of the measurement signal corresponds to the rotation frequency of the machine part;

wherein said sensor comprises at least two magnet sensors (5a to 5b") arranged fixed one behind the other in the rotation direction, relative to the encoder (1), in order to produce at least two mutually phase-shifted measurement signals ($U_{S1}$, $U_{S2}$), which correspond to the angular pitch of the encoder;

wherein the mathematical sign of the measurement signals of said magnet sensors (5a to 5b") have a characteristic (K) which behaves at least approximately with mirror-image symmetry with respect to the magnetic field strength (B); and wherein the angular pitch of the encoder is larger than the predetermined measurement resolution requires; and a means for linking the measurement signals ($U_{S1}$, $U_{S2}$) emitted by the magnet sensors (5a to 5b") to form an output signal (A', A", A'", $A^{IV}$), said output signal (A', A", A'", $A^{IV}$) being at a lower frequency than the original measurement signals ($U_{S1}$, $U_{S2}$).

13. The tachogenerator as defined in claim 12, wherein the magnet sensors (5a, 5b) are GMR sensors.

14. The tachogenerator as defined in claim 12, further comprising a means (7) for binary exclusive-OR linking to form the output signal (A, A'", $A^{IV}$).

15. The tachogenerator as defined in claim 14, further comprising a means for multiplication of the measurement signals to form the output signal.

16. The tachogenerator as defined in claim 14, further comprising a means for determining the magnitude of the difference between the measurement signals in order to produce the output signal.

17. The tachogenerator as defined in claim 12, further comprising a means for phase shifting the measurement signals ($U_1$, $U_2$) through about 90°.

18. The tachogenerator as defined in claim 12, further comprising a means for producing a rotation-direction signal from the measurement signals ($U_1$, $U_2$).

19. The tachogenerator as defined in claim 18, further comprising an edge-controlled flipflop circuit to determine the rotation direction.

20. The tachogenerator as defined claim 18, wherein the magnet sensors (5a, 5b) are connected via threshold-value switches (6) to flipflop circuits (11) whose outputs are linked to an exclusive-OR circuit (7) in order to produce the output signal (A'").

21. The tachogenerator as defined in claim 12, wherein the magnet sensors (5a, 5b) are connected to an exclusive-OR circuit (7) via threshold-value switches (6) in order to produce the output signal (A, $A^{IV}$).

22. The tachogenerator as defined in claim 12, wherein the magnet sensors (5a, 5b) are connected to a multiplication circuit (8) in order to produce the output signal (A').

23. A tachogenerator for detecting the rotation speed of a rotating machine part comprising:
- an encoder which can rotate with the machine part, said encoder comprising a plurality of magnetic poles spaced a fix distance apart from each other, wherein a measurement signal is produced in an area between adjacent magnetic poles;
- a means for sensing the measurement signal, wherein said sensor means is stationary relative to the encoder and separated from the encoder by an air gap, said sensor means having a predetermined measurement resolution corresponding to a required measurement frequency;
  - wherein the frequency of the measurement signal corresponds to the rotation frequency of the machine part; and
  - wherein the distance between the poles is larger than the predetermined measurement resolution requires;
  - wherein said sensor means produces at least two mutually phase-shifted measurement signals having frequencies which correspond to the distance between the poles; and
- a means for linking the measurement signals to form an output signal having the measurement frequency required by the predetermined measurement resolution.

24. The tachogenerator as defined in claim 23, wherein the sensor means comprises at least two Hall elements.

25. The tachogenerator as defined in claim 23, wherein the sensor means comprises at least two magnetoresistive sensor elements.

26. The tachogenerator as defined in claim 25 further comprising a means for binary exclusive-OR linking to form the output signal.

27. The tachogenerator as defined in claim 26, further comprising a means for multiplication of the measurement signals to form the output signal.

28. The tachogenerator as defined in claim 26, further comprising a means for determining the magnitude of the difference between the measurement signals.

29. The tachogenerator as defined in claim 23, wherein the distance between the poles is half the magnitude of the predetermined measurement resolution.

30. The tachogenerator as defined in claim 29 wherein the frequency of the output signal is twice the frequency of the measurement signals.

31. The tachogenerator as defined claim 23, further comprising a means for modulation of a rotation-speed signal with a rotation-direction signal, for transmission via a two-wire interface.

32. The tachogenerator as defined in claim 23, further comprising a means for phase shifting the measurement signals through about 90°.

33. The tachogenerator as defined in claim 23, further comprising a means for producing a rotation-direction signal from the measurement signals.

34. The tachogenerator as defined in claim 33, further comprising an edge-controlled flipflop circuit to determine the rotation direction.

35. The tachogenerator as defined claim 33, wherein the sensor means are connected via threshold-value switches to flipflop circuits whose outputs are linked to an exclusive-OR circuit in order to produce the output signal.

36. The tachogenerator as defined in claim 23, wherein the sensor means are connected to a multiplication circuit in order to produce the output signal.

* * * * *